(12) United States Patent
Colgrove et al.

(10) Patent No.: US 10,979,223 B2
(45) Date of Patent: Apr. 13, 2021

(54) SEPARATE ENCRYPTION FOR A SOLID-STATE DRIVE

(71) Applicant: Pure Storage, Inc., Mountain View, CA (US)

(72) Inventors: John Colgrove, Mountain View, CA (US); Peter E. Kirkpatrick, Mountain View, CA (US); Robert Lee, Mountain View, CA (US); Ethan L. Miller, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 776 days.

(21) Appl. No.: 15/421,218

(22) Filed: Jan. 31, 2017

(65) Prior Publication Data

US 2018/0219675 A1    Aug. 2, 2018

(51) Int. Cl.
*G06F 21/60*    (2013.01)
*H04L 9/14*    (2006.01)
*G06F 21/79*    (2013.01)

(52) U.S. Cl.
CPC .............. *H04L 9/14* (2013.01); *G06F 21/602* (2013.01); *G06F 21/79* (2013.01); *G06F 2221/2143* (2013.01)

(58) Field of Classification Search
CPC ...... G06F 19/328; G06F 21/602; G06F 21/79; G06F 2221/2143; G06F 11/008; G06F 11/2221; G06F 11/1451; G06F 11/2236; G06F 11/263; G06F 11/273; G06Q 10/10; G06Q 50/24; G16H 10/60; H04L 9/14; H03M 13/293; G11B 5/584; G11B 20/1816; G11B 20/10388

See application file for complete search history.

(56) References Cited

U.S. PATENT DOCUMENTS 5,390,327 A    2/1995    Lubbers et al.
5,479,653 A    12/1995    Jones
(Continued)

FOREIGN PATENT DOCUMENTS

EP    2164006    3/2010
EP    2256621    12/2010
(Continued)

OTHER PUBLICATIONS

Wong, Theodore M., et al., "Verifiable secret redistribution for archive systems," In: Proceedings on First International IEEE Security in Storage Workshop 2002, (SISW '02), pp. 1-12, Dec. 11, 2002.

(Continued)

*Primary Examiner* — Trang T Doan
(74) *Attorney, Agent, or Firm* — Womble Bond Dickinson (US) LLP (57) ABSTRACT

A method of operating a solid-state storage drive is provided. The method includes encrypting, in the solid-state storage drive, first data by a first key, and writing the encrypted first data into solid-state storage memory of the solid-state storage drive. The method includes encrypting, in the solid-state storage drive, second data by a second key, and writing the encrypted second data into the solid-state storage memory of the solid-state storage drive, wherein at least one of the first key or the second key is supplied from a source external to the solid-state storage drive.

20 Claims, 6 Drawing Sheets

(56) References Cited

U.S. PATENT DOCUMENTS

| | | |
|---|---|---|
| 5,649,093 A | 7/1997 | Hanko et al. |
| 5,764,767 A | 6/1998 | Beimel et al. |
| 6,182,214 B1 | 1/2001 | Hardjono |
| 6,275,898 B1 | 8/2001 | DeKoning |
| 6,535,417 B2 | 3/2003 | Tsuda |
| 6,643,748 B1 | 11/2003 | Wieland |
| 6,725,392 B1 | 4/2004 | Frey et al. |
| 6,836,816 B2 | 12/2004 | Kendall |
| 6,985,995 B2 | 1/2006 | Holland et al. |
| 7,032,125 B2 | 4/2006 | Holt et al. |
| 7,051,155 B2 | 5/2006 | Talagala et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,334,156 B2 | 2/2008 | Land et al. |
| 7,370,220 B1 | 5/2008 | Nguyen et al. |
| 7,424,498 B1 | 9/2008 | Patterson |
| 7,424,592 B1 | 9/2008 | Karr |
| 7,444,532 B2 | 10/2008 | Masuyama et al. |
| 7,480,658 B2 | 1/2009 | Heinla et al. |
| 7,536,506 B2 | 5/2009 | Ashmore et al. |
| 7,558,859 B2 | 7/2009 | Kasiolas |
| 7,565,446 B2 | 7/2009 | Talagala et al. |
| 7,613,947 B1 | 11/2009 | Coatney |
| 7,681,104 B1 | 3/2010 | Sim-Tang et al. |
| 7,681,105 B1 | 3/2010 | Sim Tang et al. |
| 7,730,258 B1 | 6/2010 | Smith |
| 7,743,276 B2 | 6/2010 | Jacobsen et al. |
| 7,757,038 B2 | 7/2010 | Kitahara |
| 7,778,960 B1 | 8/2010 | Chatterjee et al. |
| 7,814,272 B2 | 10/2010 | Barrall et al. |
| 7,814,273 B2 | 10/2010 | Barrall et al. |
| 7,818,531 B2 | 10/2010 | Barrall et al. |
| 7,827,351 B2 | 11/2010 | Suetsugu et al. |
| 7,827,439 B2 | 11/2010 | Matthew et al. |
| 7,870,105 B2 | 1/2011 | Arakawa et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,941,697 B2 | 5/2011 | Mathew et al. |
| 7,958,303 B2 | 6/2011 | Shuster |
| 7,971,129 B2 | 6/2011 | Watson |
| 7,991,822 B2 | 8/2011 | Bish et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim Tang et al. |
| 8,051,362 B2 | 11/2011 | Li et al. |
| 8,082,393 B2 | 12/2011 | Galloway et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 3/2012 | Jernigan, IV |
| 8,140,821 B1 | 3/2012 | Raizen et al. |
| 8,145,736 B1 | 3/2012 | Tewari et al. |
| 8,145,838 B1 | 3/2012 | Miller et al. |
| 8,145,840 B2 | 3/2012 | Koul et al. |
| 8,176,360 B2 | 5/2012 | Frost et al. |
| 8,180,855 B2 | 5/2012 | Aiello et al. |
| 8,200,922 B2 | 6/2012 | McKean et al. |
| 8,225,006 B1 | 7/2012 | Karamcheti |
| 8,239,618 B2 | 8/2012 | Kotzur et al. |
| 8,244,999 B1 | 8/2012 | Chatterjee et al. |
| 8,305,811 B2 | 11/2012 | Jeon |
| 8,315,999 B2 | 11/2012 | Chatley et al. |
| 8,327,080 B1 | 12/2012 | Der |
| 8,351,290 B1 | 1/2013 | Huang et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Filingim et al. |
| 8,473,778 B2 | 6/2013 | Simitci |
| 8,479,037 B1 | 7/2013 | Chatterjee et al. |
| 8,498,967 B1 | 7/2013 | Chatterjee et al. |
| 8,522,073 B2 | 8/2013 | Cohen |
| 8,533,527 B2 | 9/2013 | Daikokuya et al. |
| 8,544,029 B2 | 9/2013 | Bakke et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark |
| 8,660,131 B2 | 2/2014 | Vermunt et al. |
| 8,661,218 B1 | 2/2014 | Piszczek et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,713,405 B2 | 4/2014 | Healey et al. |
| 8,725,730 B2 | 5/2014 | Keeton et al. |
| 8,756,387 B2 | 6/2014 | Frost et al. |
| 8,762,793 B2 | 6/2014 | Grube et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,824,261 B1 | 9/2014 | Miller et al. |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,847 B2 | 10/2014 | Feng et al. |
| 8,862,928 B2 | 10/2014 | Xavier et al. |
| 8,868,825 B1 | 10/2014 | Hayes |
| 8,874,836 B1 | 10/2014 | Hayes |
| 8,886,778 B2 | 11/2014 | Medved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,949,502 B2 | 2/2015 | McKnight et al. |
| 8,959,110 B2 | 2/2015 | Smith et al. |
| 8,977,597 B2 | 3/2015 | Ganesh et al. |
| 9,003,144 B1 | 4/2015 | Hayes et al. |
| 9,009,724 B2 | 4/2015 | Gold et al. |
| 9,021,053 B2 | 4/2015 | Bembo et al. |
| 9,021,215 B2 | 4/2015 | Meir et al. |
| 9,025,393 B2 | 5/2015 | Wu |
| 9,043,372 B2 | 5/2015 | Makkar et al. |
| 9,053,808 B2 | 6/2015 | Sprouse |
| 9,058,155 B2 | 6/2015 | Cepulis et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,134,908 B2 | 9/2015 | Horn |
| 9,153,337 B2 | 10/2015 | Sutardja |
| 9,189,650 B2 | 11/2015 | Jaye et al. |
| 9,201,733 B2 | 12/2015 | Verma |
| 9,207,876 B2 | 12/2015 | Shu et al. |
| 9,251,066 B2 | 2/2016 | Colgrove et al. |
| 9,323,667 B2 | 4/2016 | Bennett |
| 9,323,681 B2 | 4/2016 | Apostolides et al. |
| 9,348,538 B2 | 5/2016 | Mallaiah et al. |
| 9,384,082 B1 | 7/2016 | Lee et al. |
| 9,390,019 B2 | 7/2016 | Patterson |
| 9,405,478 B2 | 8/2016 | Koseki et al. |
| 9,432,541 B2 | 8/2016 | Ishida |
| 9,438,421 B1 | 9/2016 | Roth et al. |
| 9,477,632 B2 | 10/2016 | Du |
| 9,552,299 B2 | 1/2017 | Stalzer |
| 9,818,478 B2 | 11/2017 | Chung |

(56) References Cited

U.S. PATENT DOCUMENTS

| | | | |
|---|---|---|---|
| 9,829,066 B2 | 11/2017 | Thomas et al. | |
| 9,965,345 B2* | 5/2018 | Liu | G06F 3/0616 |
| 9,965,347 B1* | 5/2018 | Klett | G06F 21/78 |
| 2002/0144059 A1 | 10/2002 | Kendall | |
| 2003/0105984 A1 | 6/2003 | Masuyama et al. | |
| 2003/0110205 A1 | 6/2003 | Johnson | |
| 2004/0161086 A1 | 8/2004 | Buntin et al. | |
| 2005/0001652 A1 | 1/2005 | Malik et al. | |
| 2005/0076228 A1 | 4/2005 | Davis et al. | |
| 2005/0235132 A1 | 10/2005 | Karr et al. | |
| 2005/0278460 A1 | 12/2005 | Shin et al. | |
| 2005/0283649 A1 | 12/2005 | Turner et al. | |
| 2006/0015683 A1 | 1/2006 | Ashmore et al. | |
| 2006/0114930 A1 | 6/2006 | Lucas et al. | |
| 2006/0174157 A1 | 8/2006 | Barrall et al. | |
| 2006/0248294 A1 | 11/2006 | Medved et al. | |
| 2007/0033205 A1 | 2/2007 | Pradhan | |
| 2007/0079068 A1 | 4/2007 | Draggon | |
| 2007/0214194 A1 | 9/2007 | Reuter | |
| 2007/0214314 A1 | 9/2007 | Reuter | |
| 2007/0234016 A1 | 10/2007 | Davis et al. | |
| 2007/0268905 A1 | 11/2007 | Baker et al. | |
| 2008/0080709 A1 | 4/2008 | Michtchenko et al. | |
| 2008/0095375 A1 | 4/2008 | Takeoka et al. | |
| 2008/0107274 A1 | 5/2008 | Worthy | |
| 2008/0155191 A1 | 6/2008 | Anderson et al. | |
| 2008/0183953 A1* | 7/2008 | Flynn | G06F 13/426 711/103 |
| 2008/0295118 A1 | 11/2008 | Liao | |
| 2009/0077208 A1 | 3/2009 | Nguyen et al. | |
| 2009/0138654 A1 | 5/2009 | Sutardja | |
| 2009/0216910 A1 | 8/2009 | Duchesneau | |
| 2009/0216920 A1 | 8/2009 | Lauterbach et al. | |
| 2010/0017444 A1 | 1/2010 | Chatterjee et al. | |
| 2010/0042636 A1 | 2/2010 | Lu | |
| 2010/0094806 A1 | 4/2010 | Apostolides et al. | |
| 2010/0115070 A1 | 5/2010 | Missimilly | |
| 2010/0125695 A1 | 5/2010 | Wu et al. | |
| 2010/0162076 A1 | 6/2010 | Sim-Tang et al. | |
| 2010/0169707 A1 | 7/2010 | Mathew | |
| 2010/0174576 A1 | 7/2010 | Naylor | |
| 2010/0268908 A1 | 10/2010 | Ouyang et al. | |
| 2010/0312915 A1 | 12/2010 | Marowsky-Bree et al. | |
| 2011/0035540 A1 | 2/2011 | Fitzgerald et al. | |
| 2011/0040925 A1 | 2/2011 | Frost et al. | |
| 2011/0060927 A1 | 3/2011 | Fillingim et al. | |
| 2011/0119462 A1 | 5/2011 | Leach et al. | |
| 2011/0219170 A1 | 9/2011 | Frost et al. | |
| 2011/0238625 A1 | 9/2011 | Hamaguchi et al. | |
| 2011/0264843 A1 | 10/2011 | Haines et al. | |
| 2011/0302369 A1 | 12/2011 | Goto et al. | |
| 2012/0011398 A1 | 1/2012 | Eckhardt | |
| 2012/0079289 A1* | 3/2012 | Weng | G06F 12/0246 713/193 |
| 2012/0079318 A1 | 3/2012 | Colgrove et al. | |
| 2012/0110249 A1 | 5/2012 | Jeong et al. | |
| 2012/0131253 A1 | 5/2012 | McKnight | |
| 2012/0150826 A1 | 6/2012 | Retnamma et al. | |
| 2012/0158923 A1 | 6/2012 | Mohamed et al. | |
| 2012/0191900 A1 | 7/2012 | Kunimatsu et al. | |
| 2012/0198152 A1 | 8/2012 | Terry et al. | |
| 2012/0198261 A1 | 8/2012 | Brown et al. | |
| 2012/0209943 A1 | 8/2012 | Jung | |
| 2012/0226934 A1 | 9/2012 | Rao | |
| 2012/0246435 A1 | 9/2012 | Meir et al. | |
| 2012/0260055 A1 | 10/2012 | Murase | |
| 2012/0311557 A1 | 12/2012 | Resch | |
| 2013/0022201 A1 | 1/2013 | Glew et al. | |
| 2013/0036314 A1 | 2/2013 | Glew et al. | |
| 2013/0042056 A1 | 2/2013 | Shats | |
| 2013/0060884 A1 | 3/2013 | Bembo et al. | |
| 2013/0067188 A1 | 3/2013 | Mehra et al. | |
| 2013/0073894 A1 | 3/2013 | Xavier et al. | |
| 2013/0124776 A1 | 5/2013 | Hallak et al. | |
| 2013/0132800 A1 | 5/2013 | Healy et al. | |
| 2013/0151653 A1 | 6/2013 | Sawicki et al. | |
| 2013/0151771 A1 | 6/2013 | Tsukahara et al. | |
| 2013/0173853 A1 | 7/2013 | Ungureanu et al. | |
| 2013/0238554 A1 | 9/2013 | Yucel et al. | |
| 2013/0259234 A1 | 10/2013 | Acar et al. | |
| 2013/0262758 A1 | 10/2013 | Smith et al. | |
| 2013/0339314 A1 | 12/2013 | Carpenter et al. | |
| 2013/0339635 A1 | 12/2013 | Amit et al. | |
| 2013/0339818 A1 | 12/2013 | Baker et al. | |
| 2014/0040535 A1 | 2/2014 | Lee | |
| 2014/0040702 A1 | 2/2014 | He et al. | |
| 2014/0047263 A1 | 2/2014 | Coatney et al. | |
| 2014/0047269 A1 | 2/2014 | Kim | |
| 2014/0063721 A1 | 3/2014 | Herman et al. | |
| 2014/0064048 A1 | 3/2014 | Cohen et al. | |
| 2014/0068224 A1 | 3/2014 | Fan et al. | |
| 2014/0075252 A1 | 3/2014 | Luo et al. | |
| 2014/0136880 A1 | 5/2014 | Shankar et al. | |
| 2014/0181402 A1 | 6/2014 | White | |
| 2014/0237164 A1 | 8/2014 | Le et al. | |
| 2014/0279936 A1 | 9/2014 | Bembo et al. | |
| 2014/0280025 A1 | 9/2014 | Eidson et al. | |
| 2014/0289588 A1 | 9/2014 | Nagadomi et al. | |
| 2014/0380125 A1 | 12/2014 | Calder et al. | |
| 2014/0380126 A1 | 12/2014 | Yekhanin et al. | |
| 2015/0032720 A1 | 1/2015 | James | |
| 2015/0039645 A1 | 2/2015 | Lewis | |
| 2015/0039849 A1 | 2/2015 | Lewis | |
| 2015/0089283 A1 | 3/2015 | Kermarrec et al. | |
| 2015/0089623 A1 | 3/2015 | Sondhi et al. | |
| 2015/0100746 A1 | 4/2015 | Rychlik | |
| 2015/0134824 A1 | 5/2015 | Mickens et al. | |
| 2015/0153800 A1 | 6/2015 | Lucal et al. | |
| 2015/0180714 A1 | 6/2015 | Chunn | |
| 2015/0248250 A1 | 9/2015 | Han et al. | |
| 2015/0280959 A1 | 10/2015 | Vincent | |
| 2016/0034206 A1 | 2/2016 | Ryan et al. | |
| 2016/0371683 A1* | 12/2016 | Maus | G06Q 20/12 |

FOREIGN PATENT DOCUMENTS

| | | |
|---|---|---|
| EP | 2639997 | 9/2013 |
| WO | 02-130033 | 2/2002 |
| WO | 2006069235 | 6/2006 |
| WO | 2008103569 | 8/2008 |
| WO | 2008157081 | 12/2008 |
| WO | 2012174427 | 12/2012 |
| WO | 2013032544 | 3/2013 |
| WO | 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-Scaling-Charts.1735-4.html), See pp. 1-2.

Stalzer, Mark A., "FlashBlades: System Architecture and Applications," Proceedings of the 2nd Workshop on Architectures and Systems for Big Data, Association for Computing Machinery, New York, NY, 2012, pp. 10-14.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

Storer, Mark W., et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

The International Search Report and the Written Opinion of the International Searching Authority, dated Mar. 8, 2018.

\* cited by examiner

SEPARATE ENCRYPTION FOR A SOLID-STATE DRIVE

BACKGROUND

Solid-state drives (SSD) write data onto and read data from solid-state memory, usually flash memory. Encryption, if used, is usually handled by processors at data sources or destinations, or by a storage array controller or processors of storage nodes in a storage cluster. The data is provided in encrypted form to the solid-state drives for storage, or read from the solid-state drives in encrypted form. Yet, there is room for improvements to efficiency, and alternative architectures for storage systems. It is in this context that the embodiments presented herein arise.

SUMMARY

In some embodiments, a method of operating a solid-state storage drive is provided. The method includes encrypting, in the solid-state storage drive, first data by a first key, and writing the encrypted first data into solid-state storage memory of the solid-state storage drive. The method includes encrypting, in the solid-state storage drive, second data by a second key, and writing the encrypted second data into the solid-state storage memory of the solid-state storage drive, wherein at least one of the first key or the second key is supplied from a source external to the solid-state storage drive.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A solid-state storage drive described herein performs encryption and decryption of data. Variations of the solid-state storage drive have various mechanisms for key determination, production and access. One version of the embodiments described below deletes encrypted user data but retains encrypted memory health data, for later reuse or testing of the solid-state storage drive. Various embodiments handle file data, objects data, metadata, or other forms of data as readily applied.

Figure 1:
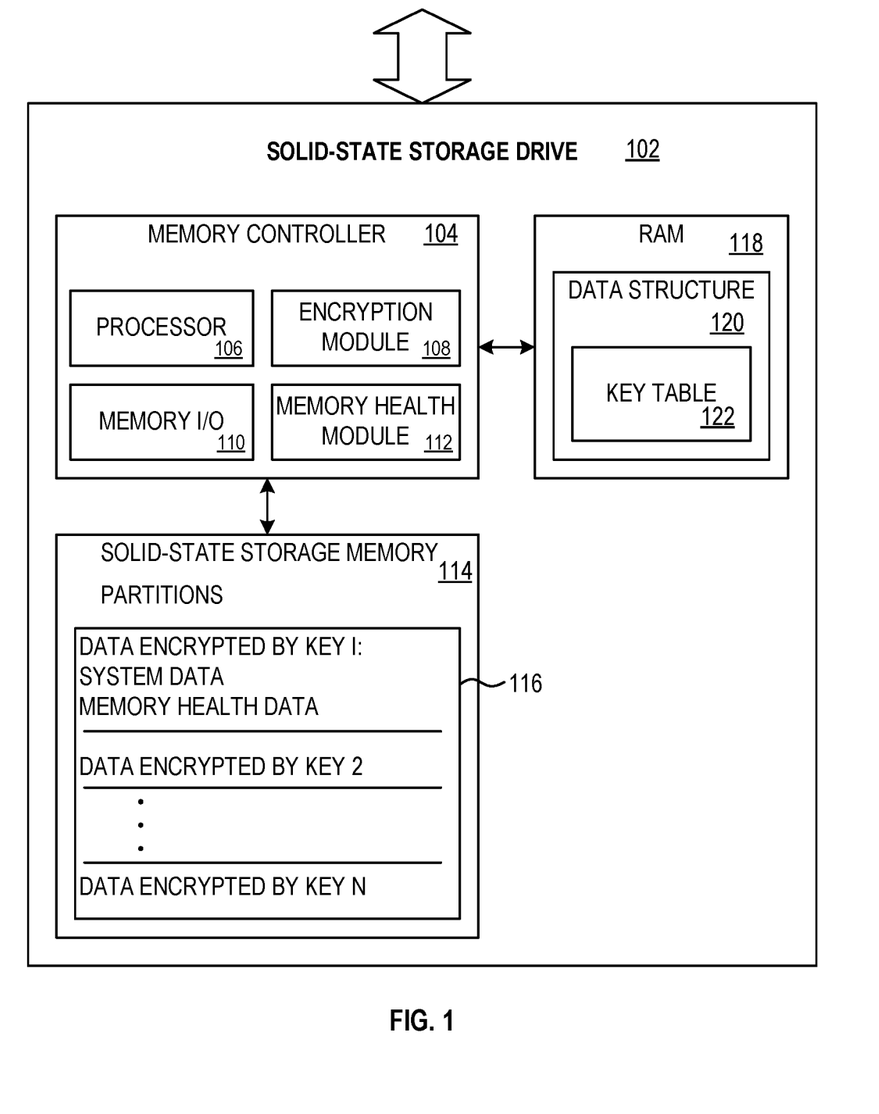
FIG. 1 is a block diagram of a solid-state storage drive that performs data encryption internally.

FIG. 1 is a block diagram of a solid-state storage drive 102 that performs data encryption internally through the hardware of the solid state drive. Inside the solid-state storage drive 102 are a memory controller 104, random access memory (RAM) 118 and solid-state storage memory 114. The memory controller 104 has a processor 106, a memory I/O (input/output) 110, an encryption module 108, and a memory health module 112. Each of the modules could be implemented as software executing on the processor 106, hardware, firmware, or combination thereof. The memory I/O 110 interfaces to the solid-state storage memory 114, which is flash memory in some embodiments. RAM 118 has, or is configurable to have, a data structure 120 that includes a key table 122 in the embodiment shown. In some versions, the RAM 118 is implemented as dynamic RAM (DRAM) supported by a power reserve such as battery backup, a super capacitor, etc., and this configuration is called NVRAM (nonvolatile random-access memory). In some embodiments, the power reserve enables transferring a subset of DRAM contents to a stable storage medium in the case of power loss. In some embodiments, the NVRAM unit is constructed with a storage class memory, such as phase change or magnetoresistive random access memory (MRAM) that substitutes for DRAM and enables a reduced power hold-up apparatus. The memory health module 112 could determine and track wear in the solid-state storage memory 114, e.g., read, write and/or erase cycles, errors or error rates, etc., and store encrypted memory health data in the solid-state storage memory 114.

In some embodiments, the solid-state storage memory 114 of FIG. 1 has, or is configurable to have, partitions 116 according to encryption keys, i.e., specific to data encrypted by specific encryption keys. These partitions could be physical domains in solid-state storage memory 114, or logical domains, in either case managed by the memory I/O 110 and the processor 106. For example, as shown in FIG. 1, one partition is for data encrypted by a key named "Key 1", and in this partition system data and/or memory health data are stored in encrypted form, i.e., encrypted by Key 1. Another partition is for data encrypted by Key 2. Further partitions are for data encrypted by further keys. In some embodiments, the keys are stored in the key table 122, and searched for or obtained and accessed by the processor 106 according to various conditions as further described below. In some embodiments, keys are passed to and/or from an external source, i.e., external to the solid-state storage drive 102. In some embodiments, keys are generated within the solid-state storage drive, by the processor 106 or other hardware internal to the solid state drive. The solid state storage drive 102 may be any suitable or commercially available solid state storage drive including wireless solid state storage drives.

Figure 2:
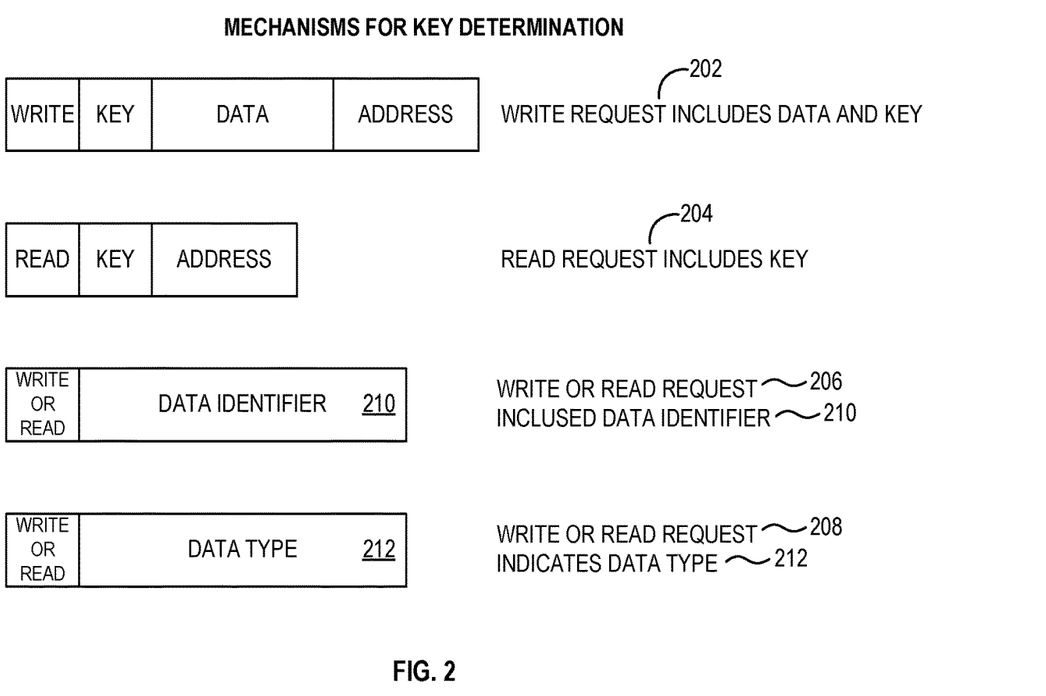
FIG. 2 depicts mechanisms for key determination in embodiments of the solid-state storage drive of FIG. 1.

FIG. 2 depicts mechanisms for key determination in embodiments of the solid-state storage 102 drive of FIG. 1. Each time the processor 106 and memory I/O 110 encrypt data for writing into the solid-state storage memory 114, or decrypt data that is read in encrypted form from the solid-state storage memory 114, the processor 106 and encryption module 108 use an appropriate key. To determine which key, various versions of the solid-state storage drive 102 use one or more of the following mechanisms described below in response to receiving a write request or a read request, e.g., from a client external to the solid-state storage drive 102. Key indexes according to the mechanisms are readily devised in keeping with the teachings herein. A write request 202 may include the data, for writing, and the key for encrypting the data in some embodiments. The write request 202 could also include address information. In order to use the key, the processor 106 extracts the key from the write request 202. A read request 204 may include the key for decrypting the data. The read request 204 could also include address information. In order to use the key, the processor 106 extracts the key from the read request 204.

Still referring to FIG. 2, a write or read request 206 may include a data identifier 210 in some embodiments. Upon receipt of the write or read request 206, the processor 106 could then generate a key, or access or obtain a key from the key table 122 according to the data identifier 210. For example, a data identifier 210 could indicate that data is owned by one of multiple clients in a multi-tenancy storage system, and each client has a specified key that is looked up in the key table 122, e.g., using a key index based on the client indicated by the data identifier 210. The data identifier 210 could indicate data belongs to a range of addresses in an address space, and each range of addresses has a specified key that is looked up in the key table 122, e.g., using a key index based on the range of addresses indicated by the data identifier 210. Other identification aspects of data could be coded into the data identifier 210 in keeping with the teachings herein. In some embodiments, the processor 106 generates a key the first time a data identifier 210 or data type 212 is seen, then stores the key in the key table 122, and accesses the key in the key table 122 for subsequent data accesses with the same data identifier 210 or data type 212.

A write or read request 208 may indicate a data type 212 in some embodiments. Similarly to the version with the data identifier 210, the processor 106 could generate a key, or access a key from the key table 122 according to the data type 212. For example, the data type 212 could indicate that the data is a type that deserves a more robust encryption key, or acceptably uses a less robust encryption key, or should be compressed as well as encrypted, or doubly encrypted, etc. Some types of data could use one key, other types of data another key, etc.

Figure 3:
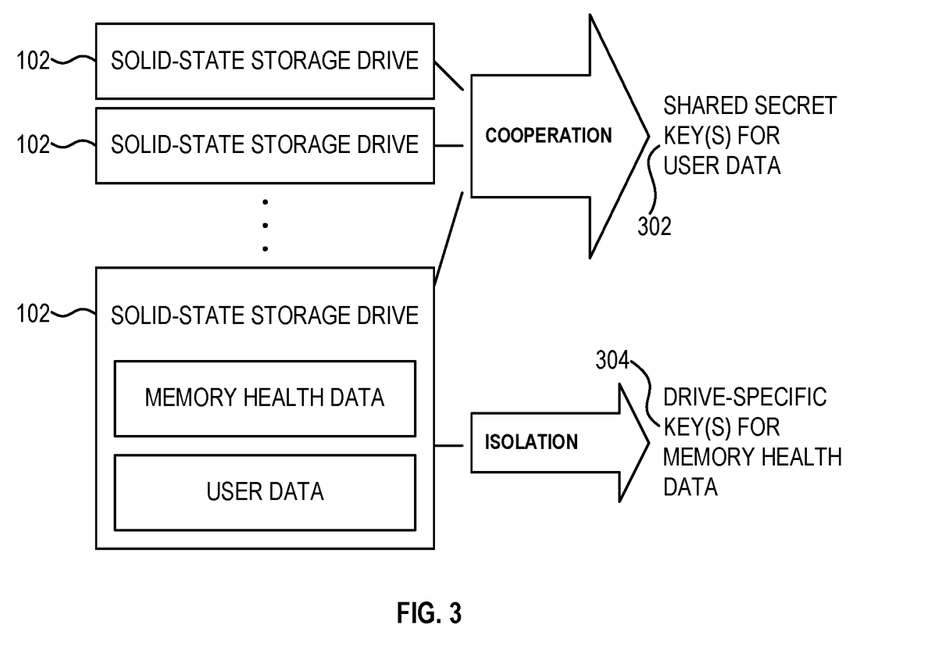
FIG. 3 depicts an embodiment of the solid-state storage drive of FIG. 1 that supports access by a drive-specific key for memory health data, and access by a shared secret key for user data.

FIG. 3 depicts an embodiment of the solid-state storage 102 drive of FIG. 1 that supports access by a drive-specific key 304 for memory health data, and access by a shared secret key 302 for user data. In the lower-most solid-state storage drive 102 shown in FIG. 3, the memory health data and user data could be stored, in encrypted form, in various locations in the solid-state storage memory 114, or in various partitions 116 as shown in FIG. 1. Such an arrangement could be adopted for the other solid-state storage drives 102 in FIG. 3, in some embodiments.

Still referring to FIG. 3, in isolation 304, the solid-state storage drive 102 (e.g., the processor 106 and the encryption module 108, or the memory controller 104 in general) uses a drive-specific key 304 or keys for accessing (reading or writing) the encrypted memory health data. The solid-state storage drive 102 in isolation cannot access the encrypted user data, in this implementation. In some embodiments, only in cooperation 302 with other solid-state storage drives 102 in a storage system, does the solid-state storage drive 102 have the capability of generating a shared secret key 302 for user data. It should be appreciated that alternative embodiments besides the example of the user data key being secret-split may be integrated to ensure that the encrypted user data cannot be accessed when the storage drive is isolated from the system. That is, the solid-state storage drives 102 are configurable to communicate with one another and generate a shared secret key 302 or keys, and then encrypt or decrypt user data. However, each solid-state storage drive 102 in isolation 304 cannot generate a shared secret key 302 and thus cannot encrypt or decrypt user data by itself without the other solid-state storage drives 102. Access to the user data is thus denied by the solid-state storage drive 102 in isolation 304. This difference in key handling protects user data if a solid-state storage drive 102 is removed from a storage system, while still allowing access to the memory health data.

Figure 4:
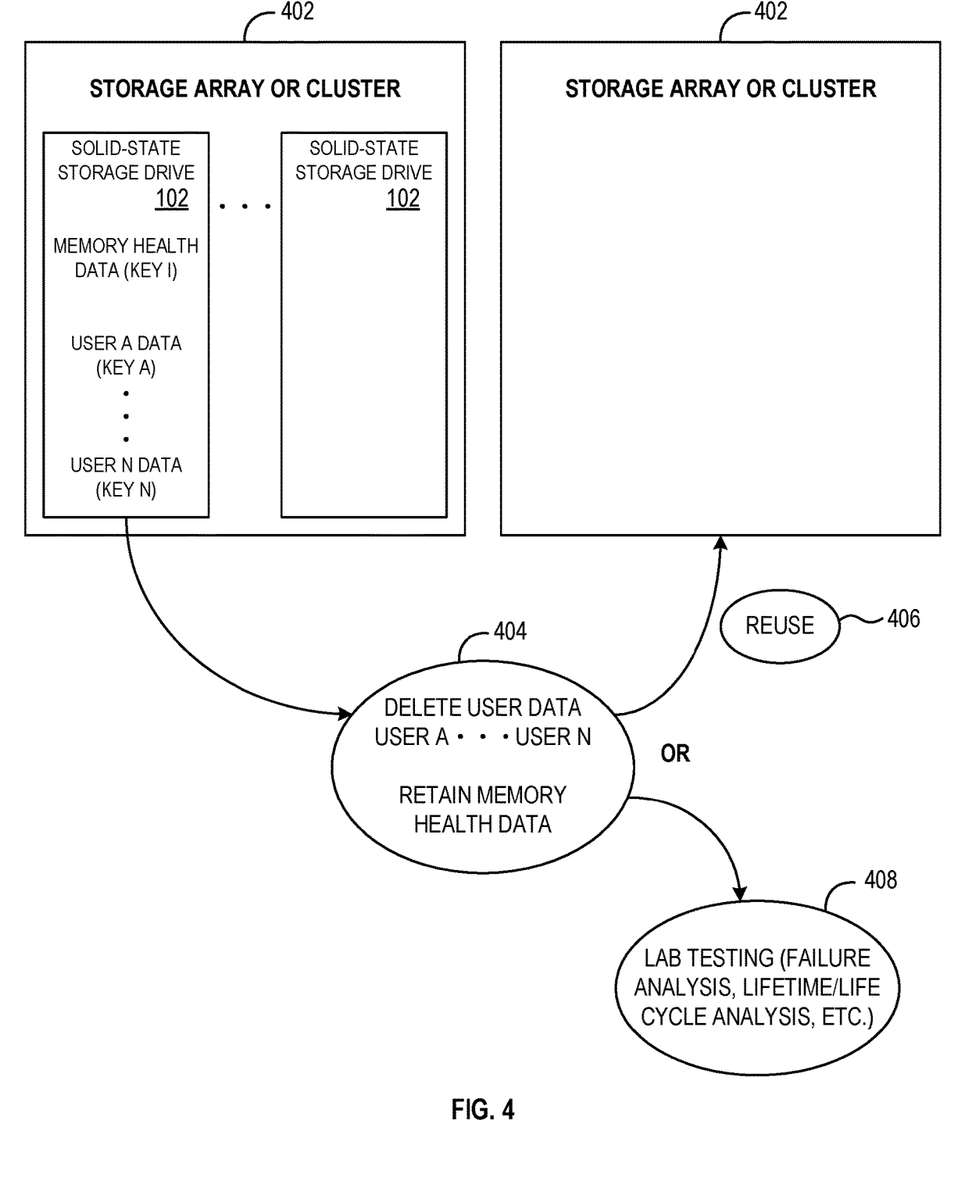
FIG. 4 depicts an embodiment of the solid-state storage drive of FIG. 1 that deletes encrypted user data and retains encrypted memory health data, for reuse or testing of the solid-state storage drive.

FIG. 4 depicts an embodiment of the solid-state storage drive 102 of FIG. 1 that deletes encrypted user data and retains encrypted memory health data, for reuse 406 or testing 408 of the solid-state storage drive 102. This embodiment is suitable for upgrade, failure and relocation scenarios for the solid-state storage drive 102. Similar to the embodiment shown in FIG. 3, or in combination with such embodiments, the version shown in FIG. 4 protects user data from theft or unauthorized access while allowing access to memory health data.

As shown in FIG. 4, the memory health data is stored in the solid-state storage drive 102 encrypted under Key 1, and user data for various users is stored in the solid-state storage drive 102 encrypted under various keys, e.g., Key A through Key N for users A through N. The solid-state storage drive 102 is removed from a storage array or cluster 402 that has multiple solid-state storage drives 102. Next, the solid-state storage drive 102 performs the action 404, and deletes user data while retaining the memory health data in some embodiments. In some embodiments, the keys for the user data may be overwritten when stored on the solid state drive 102. It should be appreciated that the user data may be marked for deletion in some embodiments, however, for embodiments where the keys for the user data are not stored on solid state drive 102, i.e., the keys are externally supplied, the data need not be deleted since the data is inaccessible with out the keys. Alternatively, in some versions, the solid-state storage drive 102 could perform the action 404 while still in the storage array or cluster 402. Then, the solid-state storage drive is ready for reuse 406, and can be inserted into another storage array or cluster 402 with the encrypted memory health data intact but all previous user data deleted or marked for deletion. If instead there has been a failure, or there is concern about a possible future failure, and it is desired to perform lab testing 408, the solid-state storage drive 102 could be sent to a lab for failure analysis, lifetime or lifecycle analysis, etc., again with the previous user data deleted or inaccessible but the encrypted memory health data intact and accessible for study, e.g., with a drive-specific key as shown in FIG. 3.

In some embodiments, the memory health data informs ongoing operation of the solid-state storage drive 102. For example, one or more parameters for operating the memory I/O 110 could be set or adjusted based on the memory health data. Garbage collection, error correction, read or write timing, retry counts, data placement, data moves, etc., could be tuned based on the memory health data in some embodiments.

Figure 5:
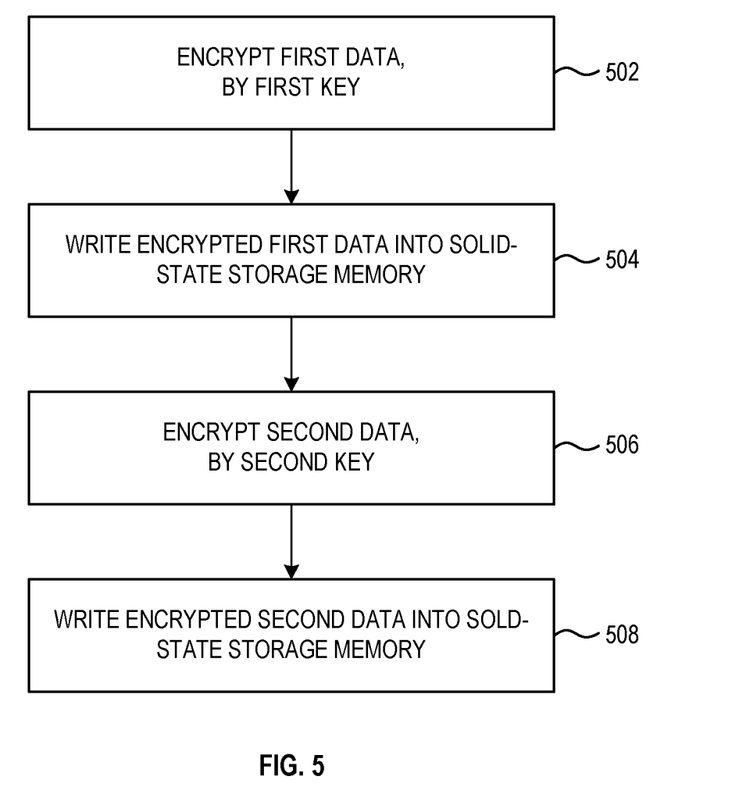
FIG. 5 is a flow diagram of a method of operating a solid-state storage drive, which can be practiced on or by embodiments shown in FIGS. 1-4.

FIG. 5 is a flow diagram of a method of operating a solid-state storage drive, which can be practiced on or by embodiments shown in FIGS. 1-4. The method can be practiced by one or more processors of a solid-state storage drive, or by a controller that includes a processor. In an action 502, first data is encrypted by a first key. The encrypted first data is written into solid-state storage memory of the solid-state storage drive, in an action 504. Second data is encrypted by a second key, in an action 506. The encrypted second data is written into the solid-state storage memory of the solid-state storage drive, in an action 508. At least one of the first key or the second key is supplied from a source external to the solid-state storage drive. In some versions of the method, the solid-state storage memory is partitioned into physical or logical regions associated with keys and data encrypted by those keys. In some versions, the first data includes memory health data pertaining to the solid-state storage memory of the solid-state storage drive. In some embodiments, the second data includes user data, associated with one or more users. Various mechanisms for key determination, key generation and key access, including supplied keys, associated keys, shared keys, drive-specific keys, and key tables as discussed above with reference to FIGS. 2 and 3 are applicable to variations of the flow diagram as readily devised. In some embodiments, the first key for the memory health data is generated internally by the solid state drive, e.g., the memory health data may be encrypted by a key that the solid state drive generates, and the system implementer may use a key-encrypting key (KEK) to protect the first data encryption key (DEK).

Various approaches could be used for data encryption keys and key-encrypting keys and these various approaches may be integrated with the embodiments described herein. A drive could generate one or more keys to encrypt user data, and store each data encrypting key for a client encrypted by a key-encrypting key that only the client knows. This embodiment allows for quick deletion, in which the storage system could delete the encrypted data encryption key. Further, the system could perform an unlock key change, by decrypting the encrypted data encryption key, and re-encrypting the data encryption key with a new key-encrypting key, while still ensuring that a system provider cannot read user data. Some embodiments could use a unique data encryption key per client, each encrypted by a key-encrypting key that only the client knows. The system could track multiple key-encrypting keys, one or more for each client, allowing each client to protect data and allowing clients to change the key by modifying the key-encrypting key. Some embodiments could use different data encryption keys for each region.

Figure 6:
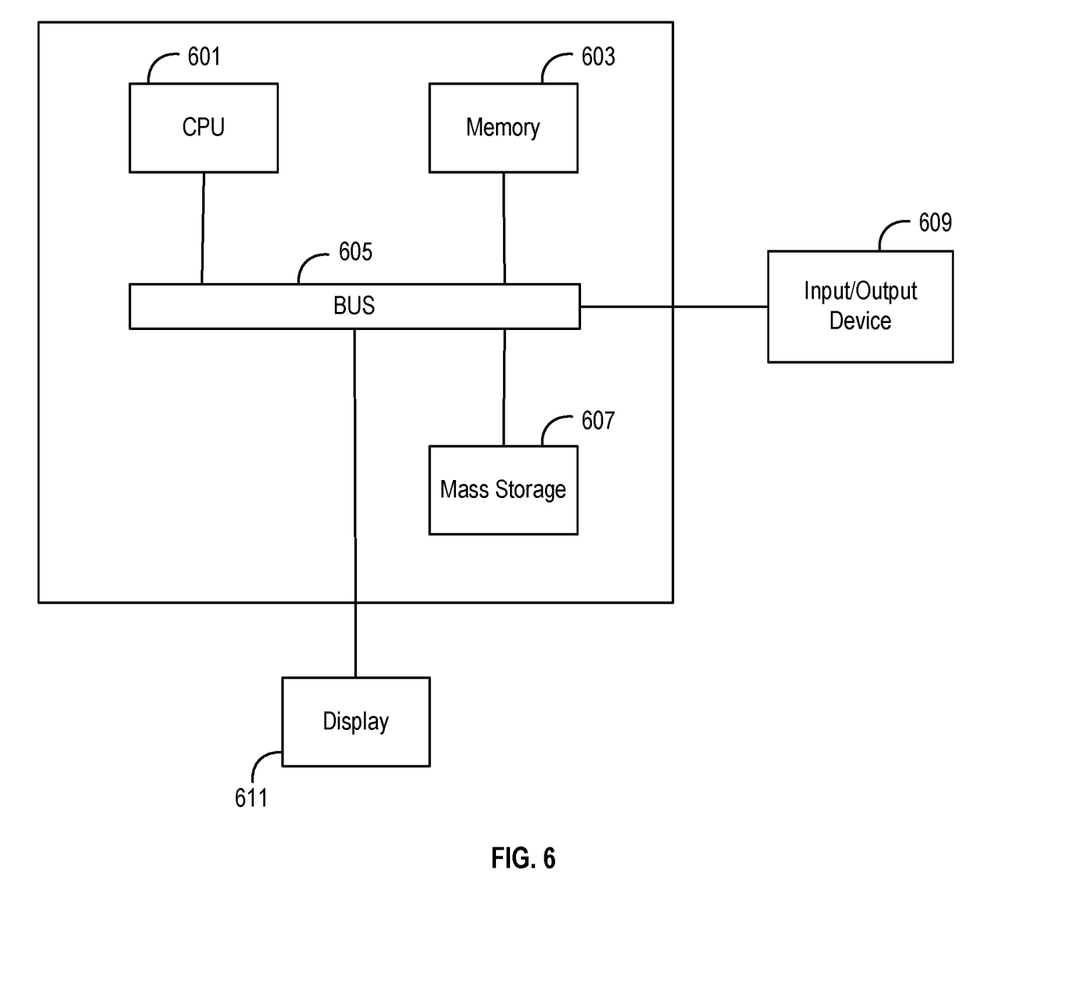
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for separate encryption for a solid-state drive in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

It should be appreciated that the storage systems and the components that are contained in such storage systems, as described in the present disclosure, are included for explanatory purposes and do not represent limitations as to the types of systems that may integrate the embodiments described above. The storage system may be configured to include solid state storage drives where data is stored in blocks, and each block essentially acts as an individual hard drive. Alternatively, storage within storage may be configured to include solid state storage drives where data is stored as object storage, where data is managed as objects. Each object may include the data itself, a variable amount of metadata, and a globally unique identifier, where object storage can be implemented at multiple levels (e.g., device level, system level, interface level). In addition, storage within any of the storage systems may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    encrypting, in the solid-state storage drive, first data by a first key, wherein the first data comprises health information relating to solid-state storage memory of a solid-state storage drive;
    writing the encrypted first data into the solid-state storage memory of the solid-state storage drive;
    encrypting, in the solid-state storage drive, second data by a second key; and
    writing the encrypted second data into the solid-state storage memory of the solid-state storage drive, wherein the first key is supplied from a source external to the solid-state storage drive, and wherein the encrypted first data and the encrypted second data is retained upon removal of the solid-state storage drive as a member of a first storage system and the encrypted first data is utilized for operation of the solid-state storage drive in a second storage system.

2. The method of claim 1, wherein the second data comprises user data from a source external to the solid-state storage drive, and wherein the first key is generated internally by the solid-state storage drive.

3. The method of claim 1, wherein:
    the writing the encrypted first data comprises writing the encrypted first data into a first physical domain specific to the first key, in the solid-state storage memory.

4. The method of claim 1, wherein:
    the writing the encrypted first data comprises writing the encrypted first data into a first logical domain associated with the first key, in the solid-state storage memory.

5. The method of claim 1, wherein the writing the encrypted second data comprises writing the encrypted second data into a second physical domain specific to the second key, in the solid-state storage memory.

6. The method of claim 1, further comprising:
    obtaining the first key from a table in the solid-state storage drive, responsive to a request to write the first data.

7. The method of claim 1, wherein the writing the encrypted second data comprises writing the encrypted second data into a second physical domain specific to the second key, in the solid-state storage memory.

8. A tangible, non-transitory, computer-readable media having instructions thereupon which, when executed by a processor in a solid-state storage drive, cause the processor to perform a method comprising:
    encrypting by a first key, first data comprising health information relating to solid-state storage memory of the solid-state storage drive;
    writing the encrypted first data into solid-state storage memory of the solid-state storage drive;
    encrypting second data by a second key, the second data comprises user data; and
    writing the encrypted second data into the solid-state storage memory of the solid-state storage drive, wherein the first key is generated internally by the solid-state storage memory and the second key is supplied from a source external to the solid-state storage drive.

9. The tangible, non-transitory, computer-readable media of claim 8, wherein the second data comprises user data from a source external to the solid-state storage drive, and wherein the first key is generated internally by the solid-state storage drive.

10. The tangible, non-transitory, computer-readable media of claim 8, wherein:
    the writing the encrypted first data comprises writing the encrypted first data into a first physical domain in the solid-state storage memory specific to the first key.

11. The tangible, non-transitory, computer-readable media of claim 8, wherein:
    the writing the encrypted second data comprises writing the encrypted second data into a second logical domain in the solid-state storage memory specific to the second key.

12. The tangible, non-transitory, computer-readable media of claim 8, wherein the writing the encrypted first data comprises writing the encrypted first data into a first logical domain in the solid-state storage memory specific to the first key.

13. The tangible, non-transitory, computer-readable media of claim 8, wherein the method further comprises:
    obtaining the first key from a table in the solid-state storage drive, responsive to a request to write the first data.

14. A solid-state storage drive, comprising:
    solid-state storage memory;
    an encryption module; and
    a memory controller, configurable to perform a method comprising:
        encrypting, by the encryption module, first data according to a first key, wherein the first data comprises health information relating to the solid-state storage memory;
        writing the encrypted first data into the solid-state storage memory;
        encrypting, by the encryption module, second data according to a second key, the second data comprises user data; and
        writing the encrypted second data into the solid-state storage memory, wherein the first key is generated internally by the solid-state storage memory and the second key is supplied from a source external to the solid-state storage drive.

15. The solid-state storage drive of claim 14, wherein the encrypting the first data is responsive to production of the first data internal to the solid-state storage drive, the second data comprises user data, and the encrypting the second data is responsive to the second data being received from a source external to the solid-state storage drive.

16. The solid-state storage drive of claim 14, further comprising:
    the solid-state storage memory configurable by the memory controller to have a first physical domain specific to data encrypted according to the first key and a second physical domain specific to data encrypted according to the second key.

17. The solid-state storage drive of claim 14, further comprising:
    the solid-state storage memory configurable by the memory controller to have a first logical domain specific to data encrypted according to the first key and a second logical domain specific to data encrypted according to the second key.

18. The solid-state storage drive of claim 14, further comprising:

the memory controller further configurable to receive the first data accompanied by the first key and to receive the second data accompanied by the second key.

19. The solid-state storage drive of claim 14, further comprising:
a further memory in the solid-state storage drive, configurable to hold a data structure for key.

20. The solid-state storage drive of claim 14, wherein the memory controller is further configurable to obtain one of the first key or the second key in the data structure in accordance with identifiers or data types of the first and second data.

\* \* \* \* \*